(12) United States Patent
Gusavac et al.

(10) Patent No.: US 8,942,128 B2
(45) Date of Patent: Jan. 27, 2015

(54) DETECTION AND PREVENTION OF HEAVY CONGESTION IN A WIRELESS NETWORK

(71) Applicant: AT&T Mobility II LLC, Atlanta, GA (US)

(72) Inventors: Vladimir Gusavac, Atlanta, GA (US); Mark Austin, Roswell, GA (US); Tracy Andre, Prairieville, LA (US)

(73) Assignee: AT&T Mobility II LLC, Atlanta, GA (US)

( * ) Notice: Subject to any disclaimer, the term of this patent is extended or adjusted under 35 U.S.C. 154(b) by 53 days.

(21) Appl. No.: 13/686,868

(22) Filed: Nov. 27, 2012

(65) Prior Publication Data

US 2014/0146681 A1    May 29, 2014

(51) Int. Cl.
*H04J 1/16*    (2006.01)
*H04W 28/02*    (2009.01)

(52) U.S. Cl.
CPC ................................ *H04W 28/0231* (2013.01)
USPC .......................................... 370/252; 370/329

(58) Field of Classification Search
USPC ................................................. 370/252, 329
See application file for complete search history.

(56) References Cited

U.S. PATENT DOCUMENTS

| | | | |
|---|---|---|---|
| 5,796,722 A | 8/1998 | Kotzin et al. | |
| 6,314,301 B1 | 11/2001 | Dorenbosch et al. | |
| 6,477,143 B1 | 11/2002 | Ginossar | |
| 6,826,620 B1 | 11/2004 | Mawhinney et al. | |
| 7,120,467 B2 | 10/2006 | Umesh et al. | |
| 7,813,329 B2 | 10/2010 | Mori et al. | |
| 8,161,182 B1 | 4/2012 | Cheng et al. | |
| 2003/0218974 A1* | 11/2003 | Zuniga | 370/229 |
| 2006/0128394 A1 | 6/2006 | Turina et al. | |
| 2008/0039089 A1 | 2/2008 | Berkman et al. | |
| 2008/0239953 A1 | 10/2008 | Bai et al. | |
| 2009/0034453 A1 | 2/2009 | Motegi et al. | |
| 2009/0163223 A1 | 6/2009 | Casey | |
| 2009/0186627 A1 | 7/2009 | Zhang | |
| 2010/0088410 A1 | 4/2010 | Ridley | |
| 2010/0232390 A1 | 9/2010 | Varma et al. | |
| 2010/0254354 A1 | 10/2010 | Sutivong et al. | |
| 2011/0176424 A1 | 7/2011 | Yang et al. | |
| 2011/0182224 A1* | 7/2011 | Ishii | 370/311 |
| 2012/0044908 A1* | 2/2012 | Spinelli et al. | 370/331 |
| 2012/0236717 A1* | 9/2012 | Saska et al. | 370/235 |
| 2013/0077482 A1 | 3/2013 | Krishna et al. | |

(Continued)

OTHER PUBLICATIONS

Office Action dated Apr. 8, 2014 for U.S. Appl. No. 13/691,495, 21 pages.

(Continued)

*Primary Examiner* — Jason Mattis

(74) *Attorney, Agent, or Firm* — Amin, Turocy & Watson, LLP

(57) ABSTRACT

Detection and prevention of heavy congestion in a wireless network is disclosed herein. Radio links are monitored and if the number of radio links reaches a first threshold level, one or more network parameters are modified in order shrink a cell footprint and/or to control cell reselection. The monitored radio links can be downlink circuit switched and packet switched radio links. Alternatively or additionally, an uplink noise level can be monitored and if the uplink noise level reaches a second threshold level, the one or more network parameters can be modified, even if the number of radio links are not at the threshold level.

19 Claims, 11 Drawing Sheets

(56) References Cited

U.S. PATENT DOCUMENTS

2013/0130691 A1* 5/2013 Zhu et al. .................. 455/436
2013/0337814 A1* 12/2013 Wong et al. ................ 455/438

OTHER PUBLICATIONS

Notice of Allowance dated Sep. 12, 2014 for U.S. Appl. No. 14/253,768, 29 pages.
Final Office Action dated Oct. 14, 2014 for U.S. Appl. No. 13/691,495, 28 pages.
Office Action dated Jul. 23, 2014 for U.S. Appl. No. 14/035,751, 22 pages.
Final Office Action dated Nov. 21, 2014 for U.S. Appl. No. 14/035,751, 27 pages.

* cited by examiner

DETECTION AND PREVENTION OF HEAVY CONGESTION IN A WIRELESS NETWORK

TECHNICAL FIELD

The subject disclosure relates to wireless communications and, also generally, to the detection and prevention of heavy congestion in a wireless network.

BACKGROUND

The wide adoption of mobile devices along with ubiquitous cellular data coverage has resulted in an explosive growth of mobile applications that expect always-accessible wireless networking. This explosion has placed strains on resources that are scarce in the mobile world. On the user side, dropped calls and poor communication have been blamed for user dissatisfaction. On the network side, instances of dropped calls and poor communication can occur during periods of heavy congestion, which can occur when there is a high concentration of active devices at a single location.

BRIEF DESCRIPTION OF THE DRAWINGS

Various non-limiting embodiments are further described with reference to the accompanying drawings in which.

DETAILED DESCRIPTION

Figure 1:
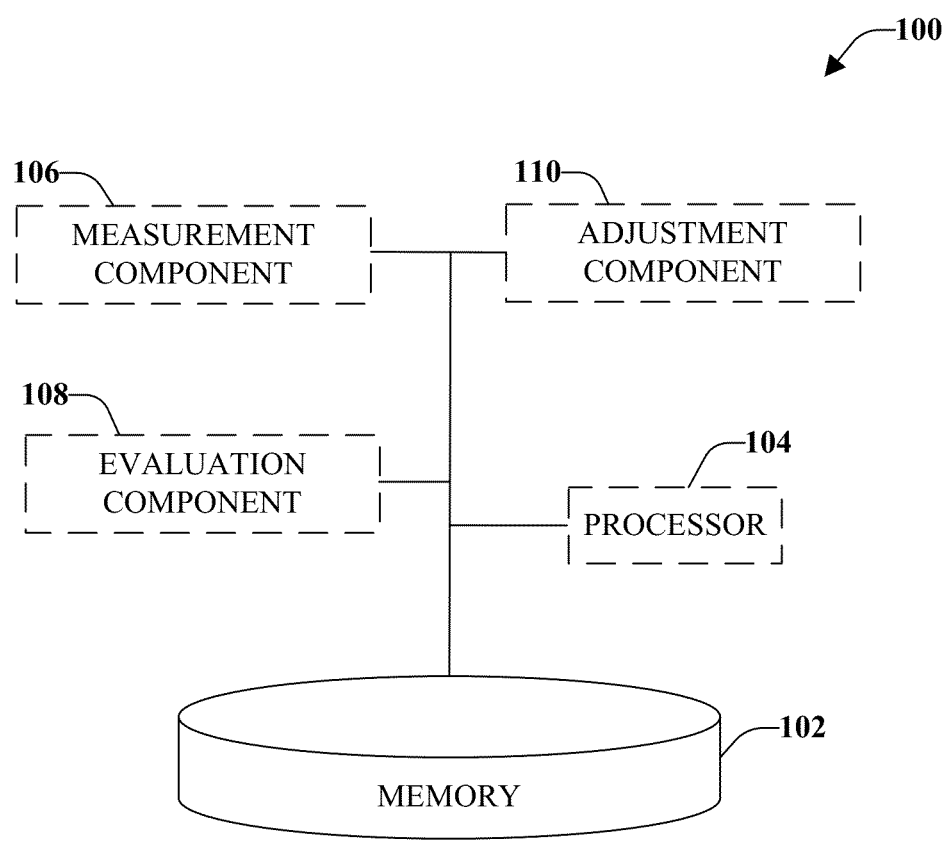
FIG. 1 illustrates an example, non-limiting system configured to prevent a wireless network from reaching a congestion point, according to an aspect.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Disclosed aspects relate to identifying and preventing a network from reaching a congestion point due to a large number of mobile devices, at a similar geographic location, using the network resources. If traffic is approaching a heavy congestion situation, one or more radio network parameters can be adjusted as appropriate for the network load. For example, if a particular event where there will be a large number of users is identified, capacity parameters can be adjusted before the event. During the event, other parameters can be changed dynamically in order to prevent congestion from reaching a critical point on both the downlink and the uplink. Such radio shaping can be an automated solution that can manage radio network parameters to appropriately adjust the parameters in view of the network load.

Various embodiments disclosed herein can be configured to identify when a wireless network is approaching a heavy congestion condition and automatically take one or more actions to avoid the heavy congestion condition. Avoidance of the heavy congestion condition can be desirable in order to reduce the number of dropped calls that occur when the network becomes congested. Further, avoidance of the heavy congestion condition can prevent a decrease in network capability, complete loss of the network due to an overload situation, poor (or no) communication, and so forth.

For example, there can be a high concentration of active mobile devices (and associated users) at a particular location. This can be a result of a high capacity venue, which can be an expected event (e.g., a special event, a music concert, a sporting event, a political rally, and so forth) and/or an unexpected event (e.g., a natural disaster, a traffic accident, an emergency, a flash mob, and so on). Due to the high concentration of mobile devices at a single location, the number of users (e.g., through respective mobile devices) that might be using and/or attempting to use the network can be more users (and associated mobile devices) than the network can adequately handle. Thus, the network might become overloaded or congested due the higher than usual amount of active devices using (or attempting to use) the network at the particular location.

For example, as a rock concert begins and the performers enter the stage area, a large number of individuals at the event might, with their respective mobile devices, take pictures of the performers and/or might record audio of the performers being introduced. Shortly after the pictures are taken and/or the audio is recorded, at least a portion of the large number of individuals that took the pictures (or recorded the audio) might attempt to share those pictures (or audio) with others at the event or, more likely, with others that are not at the event. The occurrence of a large number of mobile devices, located in the same general area, active on the network at about the same time is sometimes referred herein to as a "usage surge". For example, the individuals might send the picture(s) and/or audio through various email applications, social media applications, web-based technologies, mobile-based technologies, and/or through other means of communication. Other users might be using their devices for other purposes, such as voice calls, data calls, to surf the Internet, and for other uses that also consume network resources (sometimes referred to as "normal usage"). If the normal usage and the usage surge increases to a level that is no longer sustainable by the network, the network enters into a heavy congestion condition, which can quickly result in user dissatisfaction. Although discussed with respect to "normal usage" and a "usage surge", it is noted that the disclosed aspects do not need to distinguish the different types of usage and such distinctions are used herein merely to describe the one or more aspects.

In an example, during a high capacity venue, a network might underperform and overall the users might have a poor experience due to poor communication conditions, dropped calls, and so forth. Based on the high concentration of active mobile devices, it might be beneficial to describe and understand the network behavior as well as any limitations of the network. Detailed evaluation of network behavior in these types of scenarios can be performed and "good" and "bad" cases can be analyzed. In addition, as venue capacity demands continue to grow, as more capacity is added, and as more bandwidth hungry applications (e.g., streaming video, streaming music, and so forth) are enabled, a larger amount of data is being consumed. Traditional capacity expansion is difficult and expensive. Therefore, the disclosed aspects provide for dynamic approaches to control demand.

As utilized herein, a mobile device can include an air interface-based electronic device, such as, but not limited to, a cell phone, a PDA (personal digital assistant), a media player, a digital camera, a media recorder, a laptop, a personal computer, a printer, a scanner, a tablet, a GPS (global positioning system) module, a gaming module, and so forth. Further, the mobile device can also include air interface-based appliances that can be employed, for example, in a home, an office, a building, a retail store, a restaurant, a hotel, a factory, a warehouse, and so on. It is noted that although referred to as a "mobile device", the device can be mobile (e.g., cellular phone) and/or have limited mobility (e.g., desktop computer).

It is noted that although various aspects and embodiments are discussed herein with respect to Universal Mobile Telecommunications System (UMTS), the subject disclosure is not limited to a UMTS implementation. For example, aspects or features of the disclosed embodiments can be exploited in substantially any wireless communication technology. Such wireless communication technologies can include Universal Mobile Telecommunications System (UMTS), Code Division Multiple Access (CDMA), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

In an implementation, some networks can be self-configuring networks, wherein new base stations that are added to a network can be automatically configured and integrated into the network. The disclosed aspects can be utilized in the self-configuring networks to enable dynamic identification of a potential heavy congestion situation and configuration of various parameters to reduce the effects of the heavy congestion situation can be dynamically applied. In another implementation, some networks can be self-organizing networks, wherein heavy traffic situations can be dynamically identified and one or more modifications automatically made to one or more parameters through use of the various aspects disclosed herein.

In an implementation, a potential heavy congestion condition can be identified based on the number of radio links in use. For example, the number of radio links can be counted and a determination can be made whether or not the counted number of radio links satisfies a condition. The condition can be, for example, a threshold number of radio links that the network can support. In another example, the condition can be a number of radio links that is below the maximum number of radio links that the network can support. If the number of radio links is approaching, or is at the threshold level, various radio network parameters can be adjusted to accommodate the network load in an attempt to alleviate the occurrence of a heavy congestion condition.

In an additional or alternative implementation, a potential heavy congestion condition can be identified based on a measurement of the noise present on the uplink. For example, the measurement of the noise level can be taken and a determination can be made whether or not the noise level satisfies a condition. In this case, the condition can be, for example, a maximum amount of noise that is expected on the uplink during normal operation (e.g., not approaching a congestion level, not at a congestion level, and so on). If the noise level condition is satisfied, the one or more network parameters can be adjusted to avoid a heavy congestion condition.

Referring initially to FIG. 1, illustrated is an example, non-limiting system 100 configured to prevent a wireless network from reaching a congestion point, according to an aspect. The processes on a downlink (e.g., the communication from the network to the mobile device) and an uplink (e.g., the communication from the mobile device to the network) are generally independent. However, in a high congestion situation, the downlink can become congested before the uplink becomes congested. Then, within a relatively short period of time (e.g., 5 minutes, 15 minutes, 30 minutes) the uplink will also become congested. During the period after the downlink becomes congested and before the uplink becomes congested, the network under performs and only small traffic can be carried. For example, the system underperforms and, even though demand for traffic is high, the system can only handle minimal traffic. Thus, problems can begin to occur once congestion is reached on the downlink. After both the downlink and the uplink become congested, network traffic can no longer be carried.

Further, once the downlink, the uplink, or both the uplink and the downlink become congested, a recovery period is needed in order for the cell to return to a normal operation state. During the recovery period, the network efficiency is poor. Generally, it takes several hours for the cell to obtain its normal operation state, which can result in further user dissatisfaction. Therefore, the disclosed aspects can be utilized to adjust one or more parameters before network congestion occurs, which can prevent network congestion and the need for the recovery period.

System 100 can be implemented in a network (e.g., base station, access point, sector, and so forth). As previously noted, although various aspects are discussed herein with reference to UMTS, the aspects are not limited to a UMTS implementation. Instead, the various aspects can be utilized with other network technologies and UMTS technology is utilized herein for purposes of explaining the various aspects.

System 100 can include at least one memory 102 that can store computer executable components and instructions. System 100 can also include at least one processor 104, communicatively coupled to the at least one memory 102. Coupling can include various communications including, but not limited to, direct communications, indirect communications, wired communications, and/or wireless communications. The at least one processor 104 can facilitate execution of the computer executable components stored in the memory 102. The at least one processor 104 can be directly involved in the execution of the computer executable component(s), according to an aspect. Additionally or alternatively, the at least one processor 104 can be indirectly involved in the execution of the computer executable component(s). For example, the at least one processor 104 can direct one or more components to perform the operations.

It is noted that although one or more computer executable components may be described herein and illustrated as components separate from memory 102 (e.g., operatively connected to memory), in accordance with various embodiments, the one or more computer executable components could be stored in the memory 102. Further, while various components have been illustrated as separate components, it will be appreciated that multiple components can be implemented as a single component, or a single component can be implemented as multiple components, without departing from example embodiments.

System 100 can include a measurement component 106 that can be configured to monitor live network performance. In an implementation, the measurement component 106 can quantify the number of radio links occurring within a certain area (e.g., at a single base station, at a group of base stations, and so forth). For example, measurement component 106 can quantify the number of radio links occurring on a downlink, on an uplink, or on both the downlink and the uplink. According to an implementation, the radio links can be quantified between sectors. In accordance with some implementations, the radio links can be quantified between different carrier networks.

Based on the number of radio links measured, an evaluation component 108 determines whether the number of radio links satisfies a condition (e.g., a first condition, a radio link condition, and so on) with respect to the number of radio links that can be handled by the network while maintaining a certain level of performance. In an implementation, the number of radio links that satisfy the condition is an upper limit of radio links, which represents the maximum (or near maximum) number of radio links that can be supported by the system before network congestion occurs. For example, the condition can be a threshold number of radio links. If the number of radio links exceeds the threshold, network congestion occurs.

In some implementations, in order to allow time for the system 100 to react to a potential heavy congestion situation, the upper limit of radio links can be a number that is less than the upper limit. Thus, the threshold can be a set number of radio links below which network congestion occurs. For example, if network congestion occurs when the number of radio links reaches about 100 radio links, the threshold could be 100. However, in another implementation, the number of radio links could be less than 100 (e.g., 95 radio links, 98 radio links, 82 radio links, and so forth). By setting the number of radio links below the actual maximum number of supportable radio links, one or more network parameters can be changed, by an adjustment component 110 prior to actual congestion occurring.

Although the radio link threshold has been described with respect to an actual number of links, the threshold could be described with respect to a percentage below the maximum number of supported radio links, or based on some other criteria. For example, if a first measurement indicates that there are a certain number of radio links and a next, second measurement indicates that the number of radio links has increased by a certain number or by a certain percentage, but is under the threshold level, the condition can be satisfied. For example, if the first measurement indicates 20 radio links and the second measurement indicates 53 radio links, the condition might be met due to how quickly the network traffic is increasing. In another example, if the first measurement indicates 27 radio links and the second measurement indicates that the number of radio links has increased by 40%, for example, the condition can be met and one or more network parameters can be adjusted as disclosed herein. It should be understood that the numbers, percentages, ranges, and so forth are used herein for purposes of describing the various aspects are not meant to limit the various aspects. Further, it should be understood that any numbers, percentages, ranges, and so forth are to be understood as modified in all instances by the term "about."

If the measurement component 106 determines the number of radio links measured satisfies the condition, a notification can be is sent to the adjustment component 110, which can be configured to modify one or more network parameters. In an implementation, modifications to one or more idle mode parameters can be made dynamically by adjustment component 110 in order to maintain a radio link balance between cell carrier networks facing the same zone.

Adjustment of the parameters can be utilized to dynamically shrink the cell footprint (e.g., the geographic area covered by the base station), according to an implementation. In another implementation, an adjustment to a received signal level defined for the cell can be increased by 3 dB. In an implementation, the received signal level can be a minimum received signal level. According to another implementation, a cell reselection parameter can be increased for one (odd iteration) or two (even iteration).

In an additional or alternative implementation, measurement component 106 can be configured to measure the amount of noise on an uplink. For example, measurement component 106 can observe the noise level measurement and evaluation component 108 can determine whether or not the noise level satisfies a condition (e.g., a second condition, a noise level condition, and so on). For example, the condition can be a maximum amount of noise that should be observed on the uplink during normal operation, wherein over this amount of noise, traffic is heavy and congestion can occur. In an example, the measurement noise level might be analyzed to determine if it is below a threshold noise level. If the noise level is at or above the threshold noise level, the adjustment component 110 can modify parameters related to a minimum received signal level, a reduction to a pilot channel power, or both the minimum received signal level and the reduction to the pilot channel power.

In some implementations, the radio link condition and the noise level condition are analyzed independently such that either condition can trigger adjustment of the one or more network parameters. Further, if the radio link condition and/or the noise level condition are not satisfied (e.g., there is not yet increased or heavy use of the network resources), the evaluation component 108 can return an indication to the measurement component 106 to continue to measure the radio links and/or the noise level. In some implementations, the measurement component 106 continues to quantify the number of radio links and/or noise level on a continuous basis. For example, the measurement component 106 does not discontinue measuring radio links and/or noise level, even if the relevant condition has been satisfied.

If monitoring occurs on a continuous basis or on a near-continuous basis, consideration can be given to the time range in which the radio links are occurring and/or the increased noise level. For example, the radio links might only be evaluated for a certain time range (e.g., thirty seconds, one minute, three minutes, and so forth) and the quantified number of radio links can be automatically adjusted as the time of each radio link expires. However, according to some aspects, the radio links are measured based on individual measurements and a previous number of radio links are automatically discarded. For example, the measurement component 106 might take a measurement every ten seconds (for example) and any previous measurements are ignored.

In the case of noise measurements, if there is an increase in the uplink noise level for only a limited amount of time, and then a decrease occurs, the condition might not be satisfied. If the adjustment component 110 has already been triggered and modifications are being made to the one or more network parameters, the evaluation component 108 can send another signal to the adjustment component 110. In this case, the adjustment component 110 can determine that no further modifications should be made and/or that one or more adjustments that have been made should be reversed or returned to an initial (or previous) setting condition.

In an implementation, system 100 can include (or can access) a database in which information related to a maximum number of radio links, a maximum noise level, and/or the various network parameters are stored. It is noted that a database can include volatile memory or nonvolatile memory, or can include both volatile memory and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which can operate as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, and so on) of the various disclosed aspects is intended to comprise, without being limited to, these and any other suitable types of memory.

Figure 2:
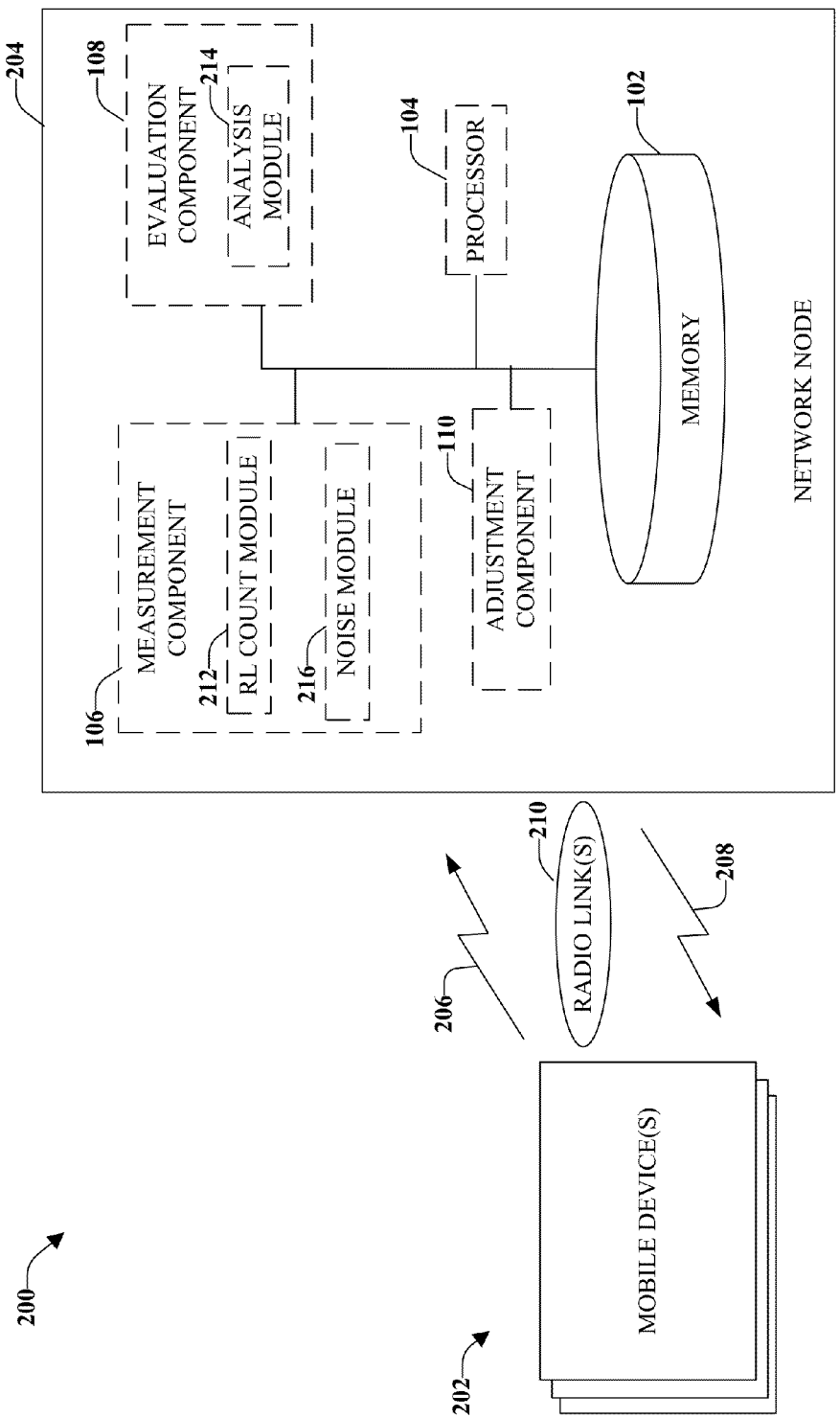
FIG. 2 illustrates an example, non-limiting system configured to detect a heavy congestion condition and modify one or more network parameters in order to avoid the congestion, according to an aspect.

FIG. 2 illustrates another example, non-limiting system 200 configured to detect a heavy congestion condition and modify one or more network parameters in order to avoid the congestion, according to an aspect. As illustrated one or more mobile devices 202 can communicate with a network node 204, which can be, for example, a base station, an access point, a sector, and so forth. As illustrated, the one or more mobile devices 202 communicate to the network node 204 over an uplink 206 and receive communications from the network node 204 over a downlink 208, through respective radio links 210.

According to an aspect, a radio link (RL) count module 212 can be configured to quantify the radio links 210. For example, the radio link count module 212 can quantify the downlink radio links, the uplink radio links, or both the downlink and the uplink radio links. In an implementation, radio link count module 212 can quantify the number of downlink circuit switched radio links and downlink packet switched radio links. In an additional implementation, soft handover radio links are not quantified. The radio links 210 can be quantified between sectors and/or between different carrier networks. Further, the radio link count module 212 can quantify the radio links 210 continuously, almost continuously, periodically, intermittently, or based on another criteria.

An analysis module 214 can be configured to determine if the number of radio links quantified by the radio link count module 212 satisfies a condition. In an implementation, the analysis module 214 can determine if the number of radio links is below a radio link threshold. For example, from a downlink perspective, it might be beneficial to maintain the number of radio links in the cell to below about 100 radio links, which can exclude soft handover radio links. Maintaining the number of radio links below the threshold can allow users to have a good communication experience. Although an example has been provided for a threshold level of 100 radio links, a different number of radio links can be utilized as an upper threshold or maximum number of radio links that can be sustained before action should be taken by an adjustment component 110.

If the number of radio links does not satisfy the condition with respect to the maximum number of radio links that can be adequately supported by the network (e.g., the number of radio links is below a threshold), as determined by the analysis module 214, no action is taken by the adjustment component 110. If, however, the number of radio links quantified satisfies the condition with respect to the maximum number of radio links that can be adequately supported by the network, as determined by the analysis module 214, the adjustment component 110 modifies one or more parameters. Modifications by the adjustment component 110 can include an increase to a minimum received signal level defined for the cell, a decrease to a common pilot channel received signal code power, a manual nodeB restart, and/or turning off enhanced uplink (EUL), for example.

Also included in system 200 is a noise module 216 that can be configured to measure the amount of noise of an uplink. For example, from the uplink perspective, the noise floor might need to remain below a certain level in order to provide a good communication experience. In an example, the noise floor might be negative 80 dBm (−80 dBm). However, the disclosed aspects are not limited to this noise level.

If the noise level on the uplink does not satisfy a condition with respect to a maximum amount of noise that can be present (e.g., the amount of noise is below a threshold noise level), no action is taken. If, however, the observed amount of noise satisfies a condition with respect to a maximum amount of noise that can be tolerated on the uplink, the adjustment component 110 modifies one or more parameters. As discussed above, modifications by the adjustment component 110 can include an increase to a minimum received signal level defined for the cell, a decrease to a common pilot channel received signal code power, a manual nodeB restart (e.g., to accelerate recovery time), and/or turning off enhanced uplink (EUL), for example.

The modifications can be made by the adjustment component 110 in order to dynamically shrink a geographic coverage area (e.g., cell footprint) and/or to maintain control of 2G to 3G reselection. Additionally or alternatively, the modifications can be made by adjustment component 110 such that a GSM (Global System for Mobile Communications) network is used a backup in the situation where a UMTS network is not able to handle all traffic demands. For example, the GSM network can be used as the backup network because once congestion is experienced on the 3G side, there is some recovery period of several hours needed to return to a normal operation state.

According to some aspects, the number of radio links and/or the noise level (or noise floor) can be configurable. For example, the downlink and uplink thresholds can be determined based on multiple analyses of high capacity events. Such analyses can occur over time and can be specific to a carrier and/or to a sector or can be applied to multiple carriers and/or sectors. In an implementation, the uplink and downlink thresholds (e.g., radio link threshold, noise level threshold) can be considered system limitations.

Figure 3:
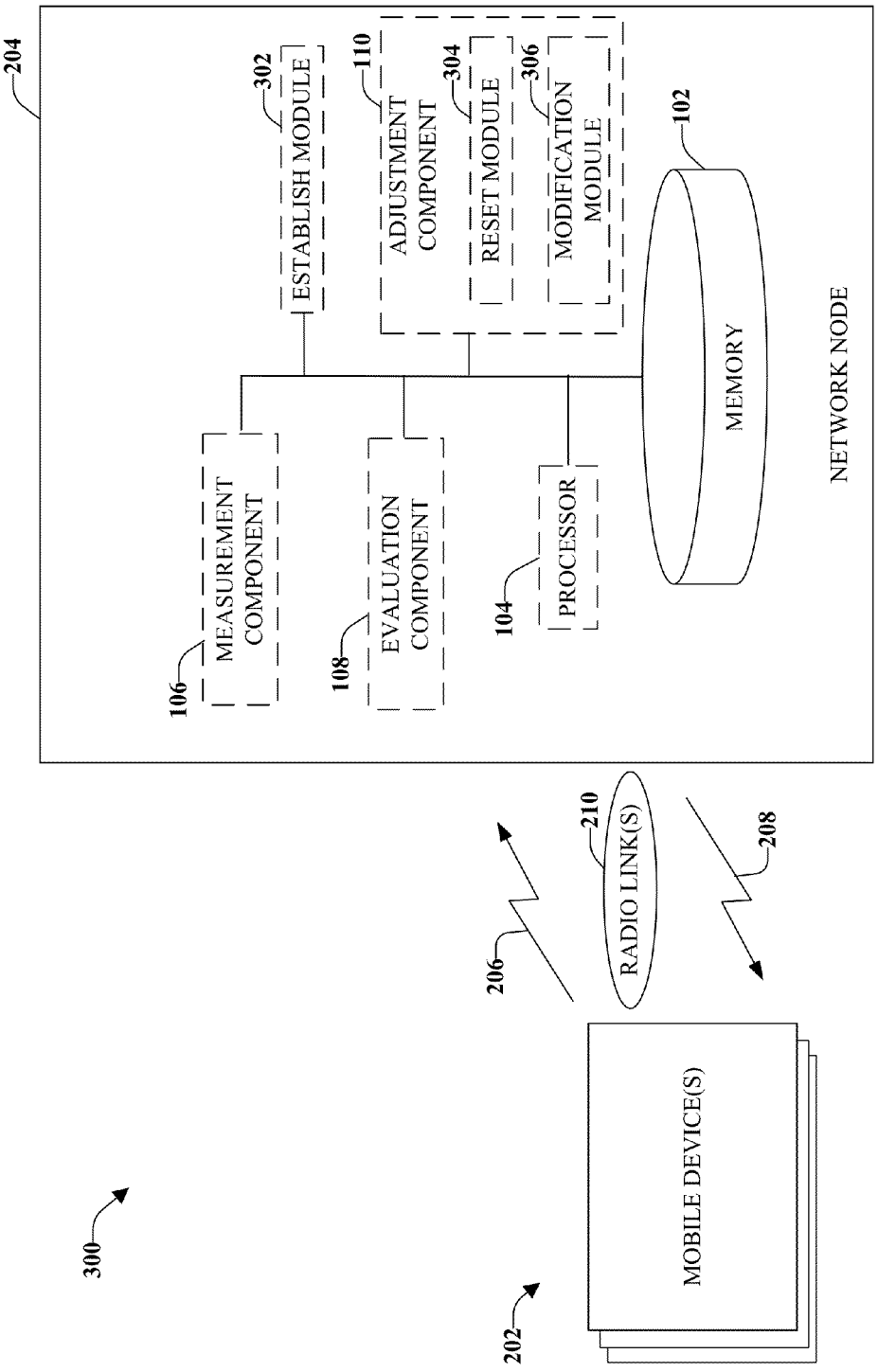
FIG. 3 illustrates an example, non-limiting system that can automatically adjust one or more network parameters when a traffic level is reaching a congestion point, according to an aspect.

FIG. 3 illustrates an example, non-limiting system 300 that can automatically adjust one or more network parameters when a traffic level is reaching a congestion point, according to an aspect. If an event having a large number of participants is expected (e.g., anticipated event), radio frequency parameters can be adjusted before the event begins. If an unanticipated event occurs (e.g., emergency situation, large gathering that was not previously publically known or not well-known, and so on), but is detected due to the large number of mobile devices accessing a network, the radio frequency parameters can be adjusted at about the same time as the unanticipated event is detected.

Before the high capacity anticipated event starts and/or at about the same time as the high capacity unanticipated event is detected, an establish module 302 can be configured to modify various radio frequency parameters. In an implementation, the radio frequency parameters initially modified by establish module 302 can be the radio frequency parameters defined as high capacity (hicap) parameters in GS. These settings can include admission thresholds, maximum and minimum power per radio link, forward access channel common downlink channel (FACH) power, enhanced uplink (EUL) settings, ideal software defined radio (ISDR), inter frequency load sharing (IFLS), and so on.

In some implementations, a minimum received signal level defined for the cell (e.g., qRxLevMin) can be initially set at negative one hundred and one (−101) dBm, for example. The cell footprint can be defined by the parameter qRxLevMin. Further to this implementation, the minimum threshold for the signal strength measure for the common pilot channel power (CPICH) received signal code power (RSCP) for cell reselection to UTRAN (UMTS Terrestrial Radio Access Network) can be initially set to negative twenty (−20), for example.

The radio frequency parameters initially set by the establish module 302 can be static, wherein these parameters are changed once before the event begins (or at about the same time as an unexpected event is detected) and do not change for the duration of the event (or until conditions return to near normal conditions). The static settings or static parameters are parameters that are used for a larger than usual amount of network traffic. In an implementation, after the event, a reset module 304 can be configured to revert the parameters to an original setting (e.g., a non-hicap setting, standard operating parameters, and so on).

During the event, if there are too many radio links measured (e.g., the number of radio links, without considering the soft handover radio links, meets or exceeds a threshold level) and/or an uplink noise level meets or exceeds a maximum noise level, a modification module 306 can be configured to selectively adjust one or more changeable parameters. Examples, of the radio frequency parameters that can be selectively adjusted by the modification module 306 during the event can include, but are not limited to, a qRxLevMin, a minimum FDD (frequency division duplex) RSCP (received signal code power) (e.g., FDDRSCPMIN) and/or CPICH power, for example. FDDRSCPMIN is a GSM RSCP threshold parameter that is used to prevent too many reselections between 3G to 2G and from 2G to 3G. The FDDRSCPMIN threshold parameter needs to be satisfied before cell selection can take place.

The modification module 306 can be configured to adjust one or more of the parameters dynamically during a near congestion time period in order to prevent the network from reaching a critical point on the downlink, the uplink, or both the downlink and the uplink. The adjustment of the parameters can be utilized for radio shaping, which is an automated solution configured to manage the network parameters to adjust the parameters appropriately in view of the network load.

According to an implementation, a way to maintain the system under control (e.g., avoid congestion) can be to shrink a cell foot print (e.g., a UMTS cell footprint). In accordance with another implementation, to avoid congestion, 2G to 3G reselection can be kept under control by adjustment to network parameter(s). In still another implementation, to avoid congestion, a GSM network can be used only as a backup in the situation that a UMTS network is not able to handle all traffic demands and to use IFLS/ISDR features.

If measurement component 106 (or another system component) determines a number of radio links is approaching a high level, a UMTS footprint defined by the parameter qRxLevMin during the event can be automatically adjusted to maintain the number of radio links per cell below a certain level, such as 100 radio links, for example, at all times during the event. Further, if the measurement component 106 (or another system component) determines a noise level is too high, an adjustment can be made in order to maintain the UL RSSI to below −80 dBM, for example, at all times during the event. Live network performance monitoring can be performed with about fifteen minute updates or at updates defined by a different interval. If the number of radio links approaches around 100 radio links and/or the noise level approaches around −80 dBm, an additional adjustment of parameters qRxLevMin, FDDRSCPMIN, and CPICH power can be made. In an implementation, the adjustments can be performed utilizing a self-organizing network (SON) solution, such as through the dynamic network parameter adjustments discussed in accordance with the various embodiments.

As discussed herein, the disclosed aspects can prevent a network from reaching a congestion point and can also improve network performance during a high capacity venue. The disclosed aspects can increase network efficiency, improve customer experience, and provide a more efficient network in terms of infrastructure and system upgrades.

Figure 4:
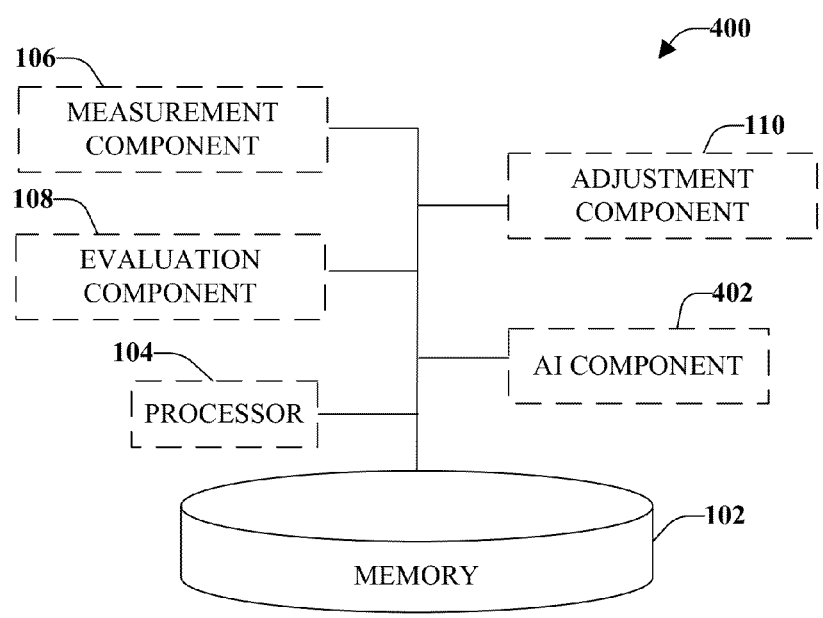
FIG. 4 illustrates an example, non-limiting system that employs an artificial intelligence component, which can facilitate automating one or more features in accordance with the disclosed aspects.

FIG. 4 illustrates an example, non-limiting system 400 that employs an artificial intelligence (AI) component 402, which can facilitate automating one or more features in accordance with the disclosed aspects. A memory 102, a processor 104, a measurement component 106, an evaluation component 108, and an adjustment component 110, as well as other components (not illustrated) can include functionality, as more fully described herein, for example, with regard to the previous figures. The disclosed aspects in connection with detecting and preventing a heavy congestion condition can employ various AI-based schemes for carrying out various aspects thereof. For example, a process for observing the number of radio link counts between the same sector and/or different carrier networks and determining whether the number of radio links observed is reaching a congestion condition, and so forth, can be facilitated with an example automatic classifier system and process. In another example, a process for observing a noise level on an uplink and determining whether the noise level is reaching a congestion condition can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed. In the case of communication systems, for example, attributes can be radio links associated with a pair of sectors and/or carriers, and the classes can be a threshold condition with respect to the number of radio links. In another example, the attributes can be noise levels and the classes can be a threshold condition with respect to a tolerable amount of noise.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage, observing network event occurrences, receiving extrinsic information, and so on). For example, SVMs can be configured via a learning or training phase within a classifier constructor and feature selection module. Thus, the classifier(s) can be used to automatically learn and perform a number of functions, including but not limited to modifying one or more radio network parameters, moving traffic to a backup network to relieve some traffic congestion, temporarily suspending an EUL, performing a restart of a NodeB, and so forth. The criteria can include, but is not limited to, network traffic limitations, active mobile device applications, service provider preferences and/or policies, location of the mobile device, location of one or more sectors, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 5:
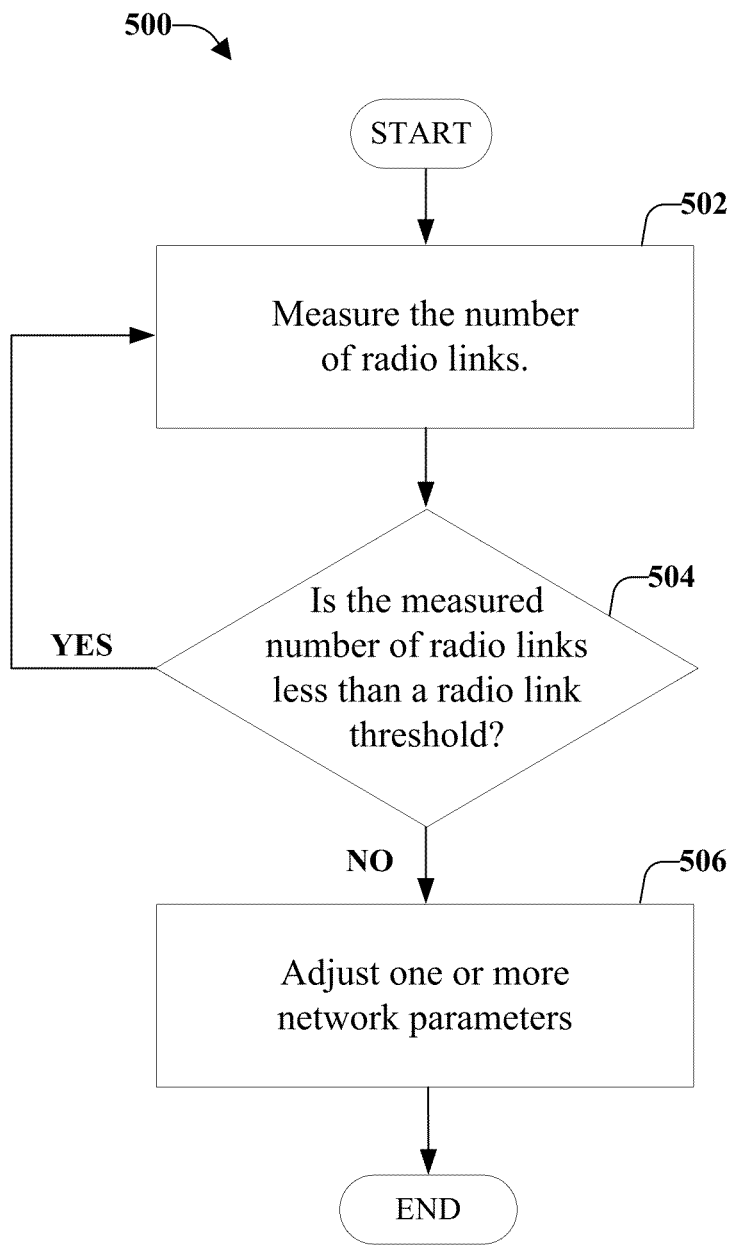
FIG. 5 illustrates an example, non-limiting method for detecting that traffic within a network is approaching a heavy traffic situation, according to an aspect.

FIG. 5 illustrates an example, non-limiting method 500 for detecting that traffic within a network is approaching a heavy traffic situation, according to an aspect. Method 500 is configured to prevent a network from reaching a congestion point. If the traffic congestion point is reached, communication problems can develop. Such communication problems include dropped calls, poor communication, and other issues that might be perceived negatively by a device user. Further, once the traffic congestion point is reached, it can take a long amount of time before the network is able to fully recover.

Method 500 starts, at 502, when radio links are measured. For example, the number of downlink radio links can be measured. In another example, the number of uplink radio links can be measured. In still a further example, the number of radio links for both the downlink and the uplink can be measured. In an implementation, at 502, the number of downlink circuit switched radio links and packet switched radio links can be measured. According to some implementations, soft handover radio links are not included in the measurement.

At 504, a determination is made whether the number of measured radio links satisfies a condition related to a maximum number of radio links. For example, the determination can be whether the measured number of radio links is less than a radio link threshold. In an implementation, at 504 it can be determined whether a measured number of circuit switch radio links and packet switch radio links satisfies a condition with respect to a maximum number of circuit switch radio links and packet switch radio links. If the number of radio links is less than the radio link threshold ("YES"), method 500 continues at 502 with measurement of the radio links.

If the determination is that the number of radio links is equal to, or more than, the radio link threshold ("NO"), method 500 continues at 506 and one or more network parameters are adjusted. For example, a minimum received signal level defined for the cell (e.g., qRxLevMin) can be increased for 3 dB. In another example, a minimum received signal level defined for the cell can be increased for 1 (odd iteration) or 2 (even iteration). If the minimum received signal level is more than a threshold level (e.g., −75 dBm), an adjustment can be made to reduce a common pilot channel power. For example, the common pilot channel power can be reduced by a reduction unit per iteration, up to a predefined number of iterations. In an example, the reduction unit can be about 2.5 dB. In another example, the predefined number of iterations can be four iterations. After the next iteration, a manual nodeB restart can be considered. In an implementation, an enhanced link uplink can be turned off, if necessary.

In an implementation, one or more network parameters can be adjusted to reduce a cell footprint in response to the measured number of circuit switch radio links and packet switch radio links satisfying the condition. According to another implementation, adjustments can be made in order to maintain control of 2G to 3G reselection. According to still another implementation, in a situation where a first network (e.g., a UMTS network) is not able to handle all traffic demands, a second network (e.g., a GSM network) can be utilized as a backup network.

Figure 6:
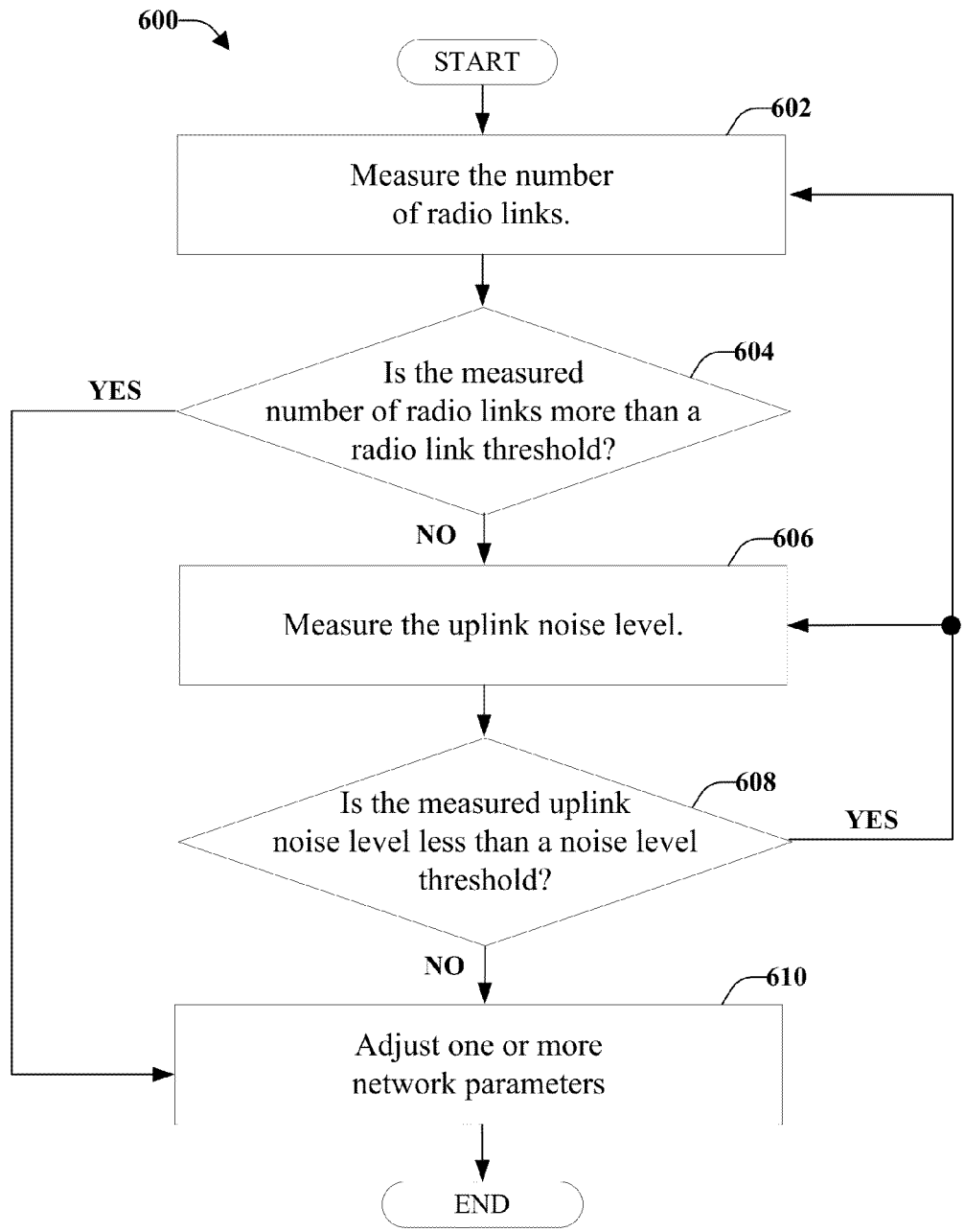
FIG. 6 illustrates an example, non-limiting method for network congestion avoidance, according to aspect.

FIG. 6 illustrates an example, non-limiting method 600 for network congestion avoidance, according to aspect. At 602, radio links are measured. For example, the number of downlink circuit switched radio links and downlink packet switched radio links can be measured. According to an aspect, soft handover radio links are not included in the radio link measurement.

At 604, a determination is made whether the number of measured radio links is more than a threshold level. For example, the threshold level can be a maximum (or near maximum) number of radio links, wherein if the amount of radio links goes above this number, congestion can occur. In another example, the threshold level can be below the maximum number of radio links (e.g., a set number below, a percentage below, and so forth). Setting the threshold level at a lower amount can allow time for adjustments to be made in order to avoid reaching a congestion level.

If the amount of radio links counted is not more than the threshold level ("NO"), the method 600 continues with measurement of an uplink noise level at 606. For example, the noise level measurement can include measuring a received signal strength indicator. Further, if the amount of radio links counted is not more than the threshold level, method 600 can continue, at 602, by continuing to monitor the number of radio links.

At 608, a determination is made whether the measured noise level is less than a noise level threshold. If it is less than the noise level threshold ("YES"), method 600 continues at 602 with radio link measurements and/or at 606 with measurements of the uplink noise level. If the noise level is more than the threshold ("NO"), method 600 continues, at 610, and one or more network parameters are adjusted.

For example, an adjustment can be made to a minimum received signal level defined for the cell. In another example, an adjustment can be made to reduce a common pilot channel power. For example, the common pilot channel power can be reduced by a reduction unit (e.g., about 2.5 dB) per iteration, up to a predefined number of iterations. After the next iteration, a manual nodeB restart can be considered. In another implementation, at a fifth iteration, an enhanced link uplink can be turned off, if necessary.

Figure 7:
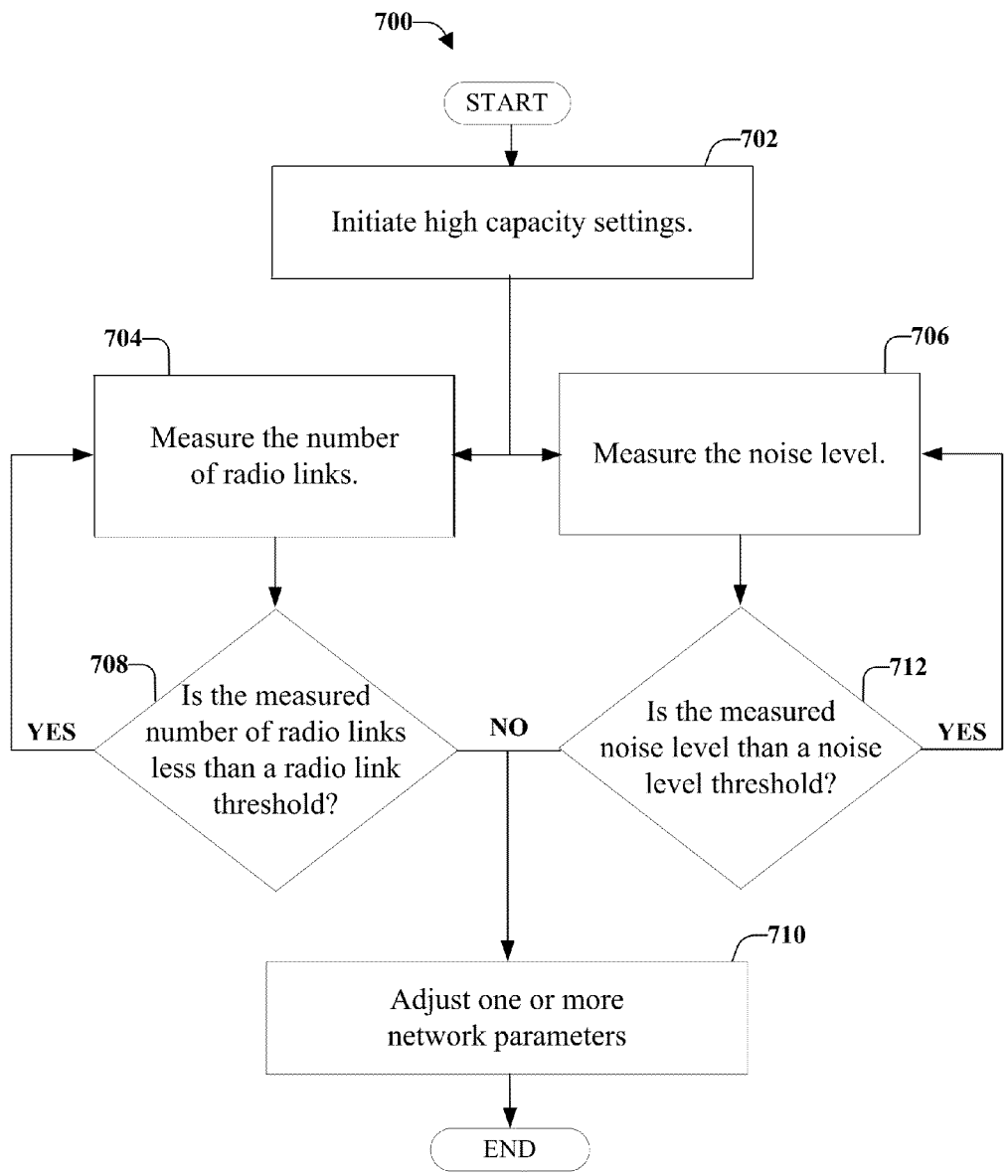
FIG. 7 illustrates another example, non-limiting method for avoidance of congestion in a wireless communications network, according to an aspect.

FIG. 7 illustrates another example, non-limiting method 700 for avoidance of congestion in a wireless communications network, according to an aspect. If it is known beforehand that a venue will have a large number of participants, high capacity settings can be initiated, at 702, for the venue. In accordance with another aspect, if an event occurs that unexpectedly caused a venue to have a large number of participants, and more than an expected amount of traffic is observed in an area, the high capacity settings can be initiated, at 702.

High capacity settings that can be initially set (or set at substantially the same time (or after) a high capacity venue is discovered) can be the hicap settings defined in GS. Such settings can include, but are not limited to, admission thresholds, maximum and/or minimum power per radio link, FACH power, EUL settings, ISDR, IFLS, and so forth. The high capacity settings can be static settings that can be used to handle a larger than usual amount of network traffic.

Method 700 can continue at 704, with measurement of the number of downlink circuit switched and packet switched radio links (excluding soft handover radio links). Additionally or alternatively, method 700 can continue at 706, with measurement of an uplink noise level. For example, a measurement of the received signal strength indicator can be performed at 706.

At 708, a determination is made whether the measured number of radio links is less than a radio link threshold. If the measured amount is less than the threshold ("YES"), method continues at 704 with continued measurement of the radio links. If the measured amount is more than the threshold ("NO"), method 700 continues at 710 with adjustment to one or more network parameters, as discussed herein, in order to avoid network congestion.

Additionally or alternatively, a determination is made, at 712, whether the measured noise level is less than a noise level threshold. If the measured amount is less than the threshold ("YES"), method 700 continues at 706 with continued measurement of the noise level. If the measured amount is more than the threshold ("NO"), method 700 continues at 710 with adjustment(s) to one or more network parameters, as discussed herein, in order to avoid network congestion.

For example, at 710, idle mode parameters can be dynamically adjusted in order to maintain radio links balanced between cell carriers facing the same zone. In an implementation, a UMTS cell footprint can be dynamically reduced and/or 2G to 3G reselection can be kept under control through modification of the one or more parameters. In another example, a first network can be utilized as a backup network for a second network that is approaching a congestion condition.

Figure 8:
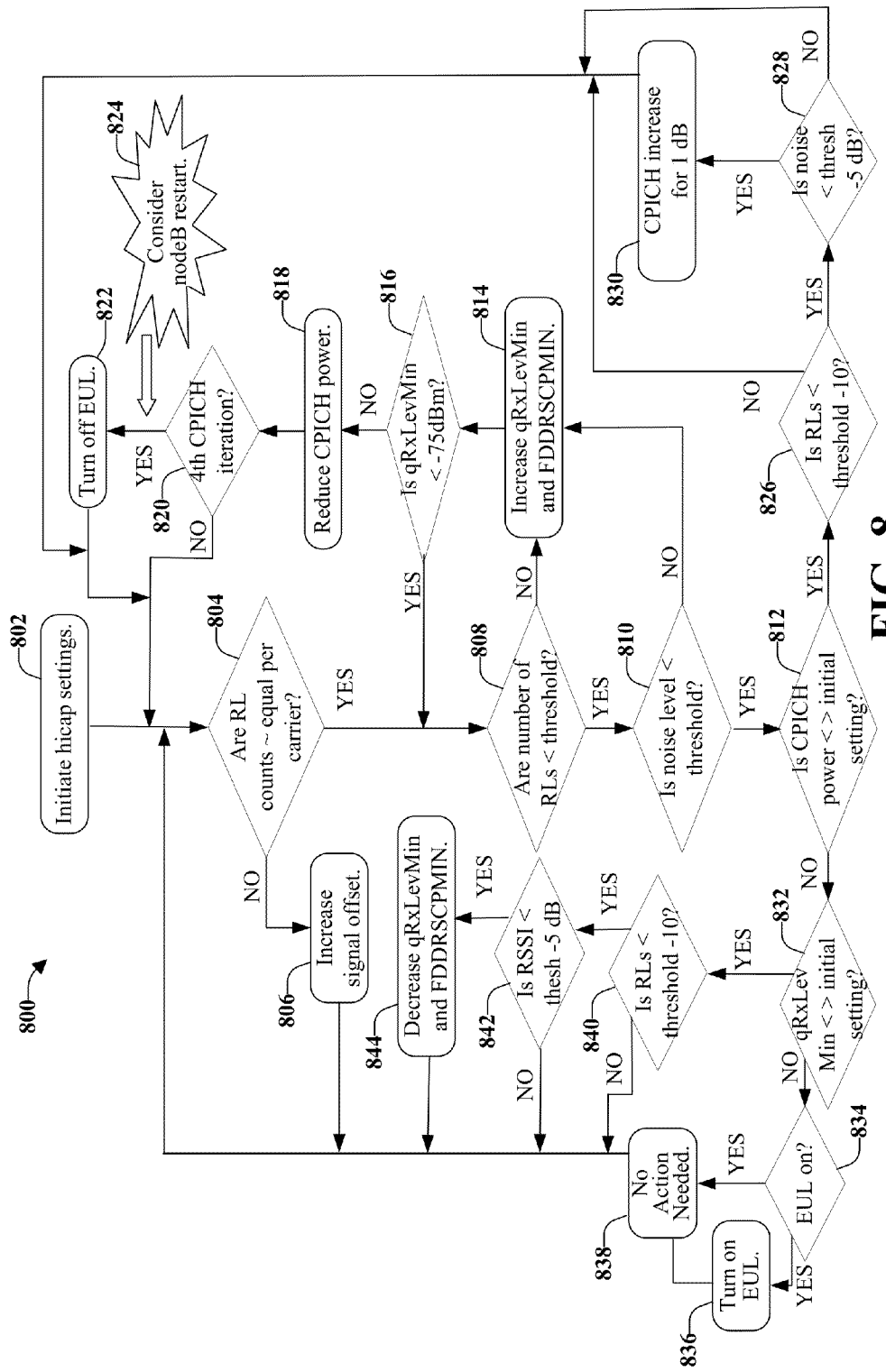
FIG. 8 illustrates an example, non-limiting method for avoiding network congestion, according to an aspect.

FIG. 8 illustrates an example, non-limiting method 800 for avoiding network congestion, according to an aspect. Although method 800 is described in detail with respect to a UMTS implementation, as previously discussed, the various aspects disclosed herein can be utilized in a non-UMTS implementation.

Method 800 starts, at 802, when high capacity settings are initiated. For example, hicap settings can be put in place as defined in GS, wherein qRxLev Min is equal to −101 dBm and FDDRSCPMIN is equal to −20. The high capacity settings can be initiated before an expected high capacity event occurs and/or after detection of an unexpected (e.g., unexpected to the wireless network) high capacity event.

At 804, a determination is made whether face/zone radio link (RL) counts are approximately equal per carrier across the face zone. If the radio link counts are not approximately equal per carrier across the face/zone ("NO"), method 800 continues, at 806, with an increase to a signal offset between a serving cell and a neighbor cell, based on CPICH Ec/No (e.g., Qoffset2sn). For example, the increase can be for 2 dB per iteration, up to four iterations (e.g., 8 dB) maximum (e.g., method 800 can continue at 804 up to four times).

If the determination at 804 is that the radio link counts are approximately equal per carrier across the face/zone ("YES"), method 800 continues, at 808, where a determination is made whether the number of downlink circuit switched and packet switched radio links is less than a radio link threshold. If it is less than the radio link threshold ("YES"), method 800 continues at 810 and a determination is made whether an uplink RSSI is less than a RSSI threshold. If the determination is that the noise is less than the threshold, method 800 continues, at 812, and a determination is made whether the CPICH power is less than or equal to ($<>$) the initial setting.

If the determination at 808 is that the number of downlink radio links is more than the threshold ("NO") and/or if the determination at 810 is that the noise level is more than the threshold ("NO"), method 800 continues at 814 when a minimum received signal level defined for the cell (e.g., qRxLevMin) and a GSM FDDRSCPMIN can be increased. For example, the qRxLevMin can be increased for 3 dB and the FDDRSCPMIN can be increased for one (odd iteration) and two (even iteration).

At 816, a determination is made whether the minimum received signal level is less than −75 dBm. If it is below −75 dBm ("YES"), method 800 continues at 808 with measurement of the radio links. If it is not below −75 dBM ("NO"), method continues, at 818 and the CPICH power is reduced for about 2.5 dB per CPICH iteration for up to four CPICH iterations. For example, the CPICH power can be reduced up to 10 dB because, after this reduction, it has been observed that further decreases to the CPICH power might not be adequate to prevent the network congestion.

At 820, a determination is made whether it is the fourth CPICH iteration. If it is not yet the fourth iteration ("NO"), method 800 continues, at 804, with a determination whether the face/zone radio link counts are approximately equal per carrier across the face/zone. If the determination, at 820, is that it is the fourth iteration ("YES"), method 800 can continue, at 822, and on a fifth iteration, an enhanced uplink (EUL) can be turned off and method can continue, at 804. Further, at 824, a consideration as to whether a nodeB should be restarted can be made. According to an aspect, a prompt can be sent to, for example, a system operator. The prompt can indicate that a nodeB restart should be considered based on traffic conditions within the cell. The decision whether to restart the nodeB can be based on network parameters, operating procedures, policies, rules, and so forth.

Returning to the determination at 812, if the determination is that the CPICH power is not equal to the initial setting "YES" (e.g., CPICH power is <> initial setting), method 800 continues, at 826, with a determination whether the number of downlink radio links (circuit switched and packet switched) is less than the radio link threshold minus ten radio links. It the number of radio links is less than ten radio links below the radio link threshold "YES", at 828 a determination is made whether the uplink noise level (RSSI) is less than the noise level threshold minus 5 dB. If the noise level is less than five below the threshold "YES", the CPICH is increased for 1 dB at 830 and method 800 continues, at 804. Further, if the determination at 826 is that the number of radio links is not less than the radio link threshold minus 10 ("NO"), method 800 continues 804. Additionally, if the determination, at 828, is that the noise level is not less than the noise level threshold less 5 dB ("NO"), method 800 continues at 804.

Returning again to the determination at 812, if the CPICH power is equal to the initial power setting (e.g., not <> initial power setting), at 832 a determination is made whether the qRLevMin is not equal to (e.g., <>) the initial setting. If not, a determination is made, at 834, whether enhanced uplink is on. If not, at 836, enhanced uplink is turned on. If the determination at 834 is that enhanced uplink is on "YES" (or after the enhanced uplink is turned on, at 836, no action is required, at 838, and method continues at 804.

If the determination, at 832 is the qRxLevMin is not equal to the initial setting ("YES"), at 840, a determination is made whether the number of downlink radio links (circuit switched and packet switched) is less ten radio links below the radio link threshold. If yes, a determination is made at 842 whether the uplink noise level is less than 5 dB below the threshold. If yes, at 844, the qRxLevMin is decreased for 3 dB and GSM FDDRSCPMIN is decreased for one (odd iteration) and two (even iteration) and method 800 continues at 804. For determinations that result in a no at 840 and/or 842, method 800 continues at 804 and continuous monitoring of the network performance continues in order to avoid heavy congestion.

Figure 9:
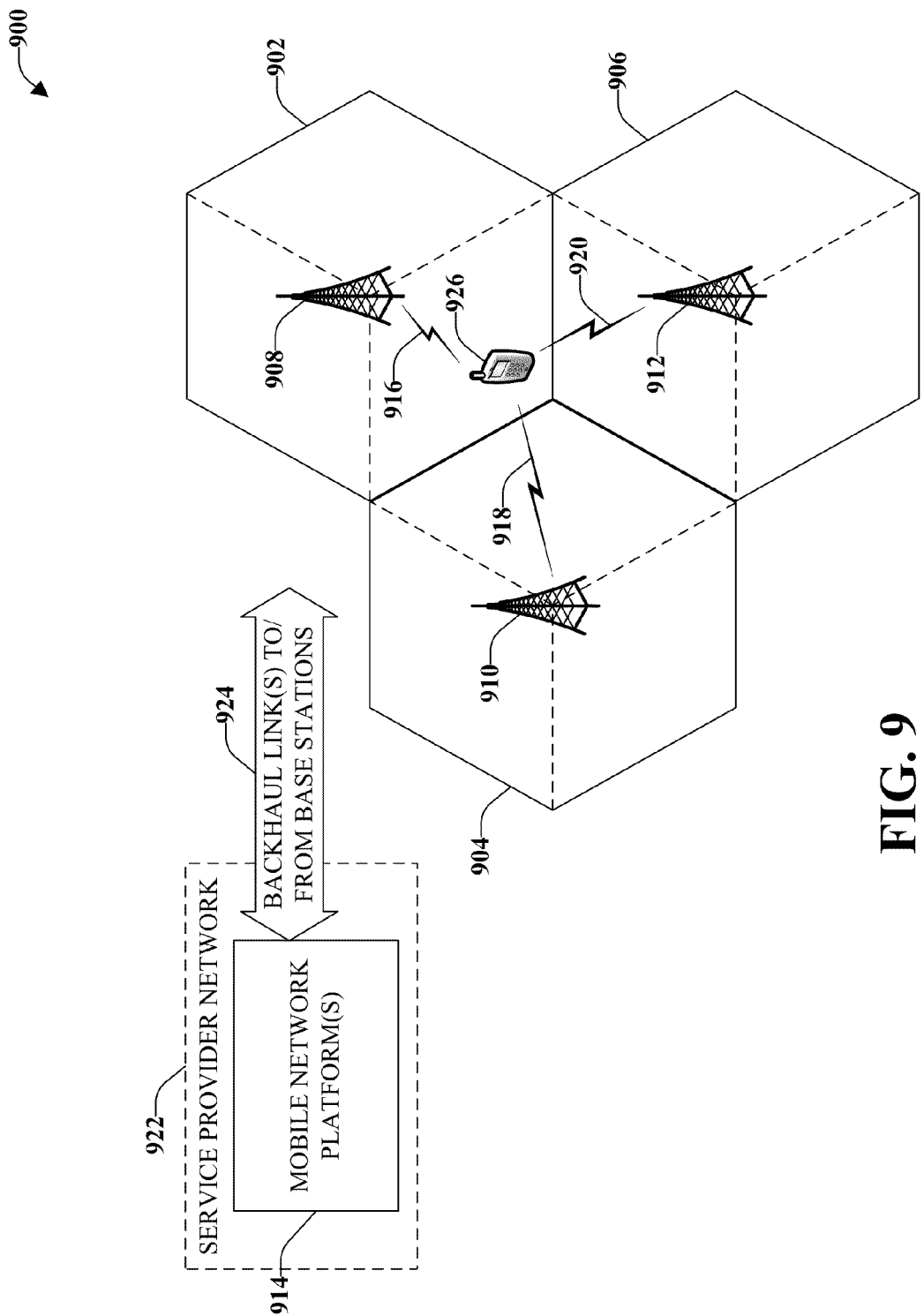
FIG. 9 is a schematic example wireless environment that can operate in accordance with aspects described herein.

By way of further description with respect to one or more non-limiting ways to detect a heavy traffic condition and prevent network congestion, FIG. 9 is a schematic example wireless environment 900 that can operate in accordance with aspects described herein. In particular, example wireless environment 900 illustrates a set of wireless network macro cells. Three coverage macro cells 902, 904, and 906 include the illustrative wireless environment; however, it is noted that wireless cellular network deployments can encompass any number of macro cells. Coverage macro cells 902, 904, and 906 are illustrated as hexagons; however, coverage cells can adopt other geometries generally dictated by a deployment configuration or floor plan, geographic areas to be covered, and so on. Each macro cell 902, 904, and 906 is sectorized in a $2\pi/3$ configuration in which each macro cell includes three sectors, demarcated with dashed lines in FIG. 9. It is noted that other sectorizations are possible, and aspects or features of the disclosed subject matter can be exploited regardless of type of sectorization. Macro cells 902, 904, and 906 are served respectively through base stations or eNodeBs 908, 910, and 912. Any two eNodeBs can be considered an eNo-deB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 914, and set of base stations (e.g., eNode B 908, 910, and 912) that serve a set of macro cells; electronic circuitry or components associated with the base stations in the set of base stations; a set of respective wireless links (e.g., links 916, 918, and 920) operated in accordance to a radio technology through the base stations, form a macro radio access network (RAN). It is further noted that, based on network features, the radio controller can be distributed among the set of base stations or associated radio equipment. In an aspect, for UMTS-based networks, wireless links 916, 918, and 920 embody a Uu interface (UMTS Air Interface).

Mobile network platform(s) 914 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any EM frequency bands licensed by the service provider network 922 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 914 can control and manage base stations 908, 910, and 912 and radio component(s) associated thereof, in disparate macro cells 902, 904, and 906 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), mobile network platform 914 can be embodied in the service provider network 922.

In addition, wireless backhaul link(s) 924 can include wired link components such as T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 924 embodies IuB interface.

It is noted that while exemplary wireless environment 900 is illustrated for macro cells and macro base stations, aspects, features and advantages of the disclosed subject matter can be implemented in microcells, picocells, femto cells, or the like, wherein base stations are embodied in home-based equipment related to access to a network.

Figure 10:
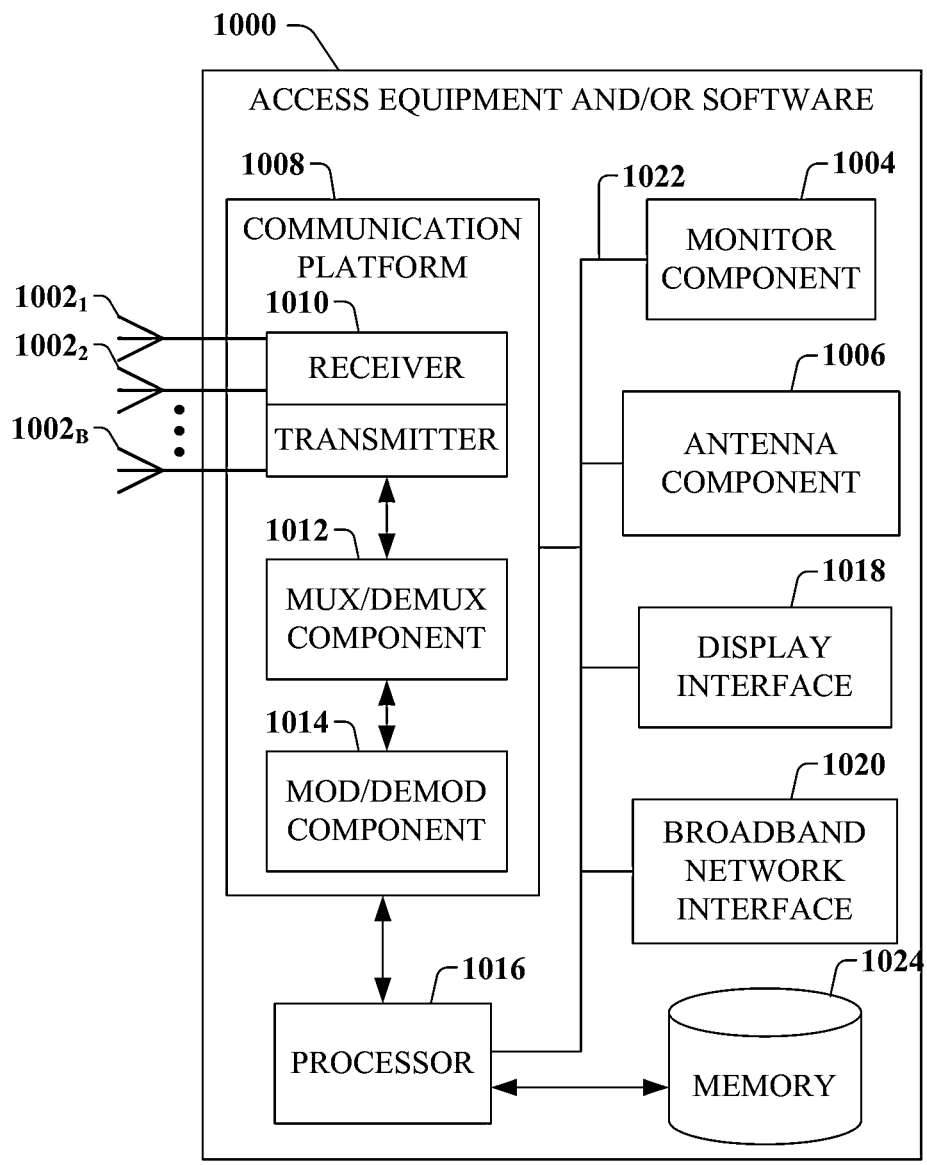
FIG. 10 illustrates a block diagram of access equipment and/or software related to access of a network, in accordance with an embodiment.

To provide further context for various aspects of the disclosed subject matter, FIG. 10 illustrates a block diagram of an embodiment of access equipment and/or software 1000 related to access of a network (e.g., base station, wireless access point, femtocell access point, and so forth) that can enable and/or exploit features or aspects of the disclosed aspects.

Access equipment and/or software 1000 related to access of a network can receive and transmit signal(s) from and to wireless devices, wireless ports, wireless routers, etc. through segments $1002_1$-$1002_B$ (B is a positive integer). Segments $1002_1$-$1002_B$ can be internal and/or external to access equipment and/or software 1000 related to access of a network, and can be controlled by a monitor component 1004 and an antenna component 1006. Monitor component 1004 and antenna component 1006 can couple to communication platform 1008, which can include electronic components and associated circuitry that provide for processing and manipulation of received signal(s) and other signal(s) to be transmitted.

In an aspect, communication platform 1008 includes a receiver/transmitter 1010 that can convert analog signals to digital signals upon reception of the analog signals, and can convert digital signals to analog signals upon transmission. In addition, receiver/transmitter 1010 can divide a single data stream into multiple, parallel data streams, or perform the reciprocal operation. Coupled to receiver/transmitter 1010 can be a multiplexer/demultiplexer 1012 that can facilitate manipulation of signals in time and frequency space. Multiplexer/demultiplexer 1012 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 1012 can scramble and spread information (e.g., codes, according to substantially any code known in the art, such as Hadamard-Walsh codes, Baker codes, Kasami codes, polyphase codes, and so forth).

A modulator/demodulator 1014 is also a part of communication platform 1008, and can modulate information according to multiple modulation techniques, such as frequency modulation, amplitude modulation (e.g., M-ary quadrature amplitude modulation (QAM), with M a positive integer); phase-shift keying (PSK); and so forth).

Access equipment and/or software 1000 related to access of a network also includes a processor 1016 configured to confer, at least in part, functionality to substantially any electronic component in access equipment and/or software 1000. In particular, processor 1016 can facilitate configuration of access equipment and/or software 1000 through, for example, monitor component 1004, antenna component 1006, and one or more components therein. Additionally, access equipment and/or software 1000 can include display interface 1018, which can display functions that control functionality of access equipment and/or software 1000, or reveal operation conditions thereof. In addition, display interface 1018 can include a screen to convey information to an end user. In an aspect, display interface 1018 can be an LCD (Liquid Crystal Display), a plasma panel, a monolithic thin-film based electrochromic display, and so on. Moreover, display interface 1018 can include a component (e.g., speaker) that facilitates communication of aural indicia, which can also be employed in connection with messages that convey operational instructions to an end user. Display interface 1018 can also facilitate data entry (e.g., through a linked keypad or through touch gestures), which can cause access equipment and/or software 1000 to receive external commands (e.g., restart operation).

Broadband network interface 1020 facilitates connection of access equipment and/or software 1000 to a service provider network (not shown) that can include one or more cellular technologies (e.g., 3GPP UMTS, GSM, and so on.) through backhaul link(s) (not shown), which enable incoming and outgoing data flow. Broadband network interface 1020 can be internal or external to access equipment and/or software 1000, and can utilize display interface 1018 for end-user interaction and status information delivery.

Processor 1016 can be functionally connected to communication platform 1008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1016 can be functionally connected, through data, system, or an address bus 1022, to display interface 1018 and broadband network interface 1020, to confer, at least in part, functionality to each of such components.

In access equipment and/or software 1000, memory 1024 can retain location and/or coverage area (e.g., macro sector, identifier(s)), access list(s) that authorize access to wireless coverage through access equipment and/or software 1000, sector intelligence that can include ranking of coverage areas in the wireless environment of access equipment and/or software 1000, radio link quality and strength associated therewith, or the like. Memory 1024 also can store data structures, code instructions and program modules, system or device information, code sequences for scrambling, spreading and pilot transmission, access point configuration, and so on. Processor 1016 can be coupled (e.g., through a memory bus), to memory 1024 in order to store and retrieve information used to operate and/or confer functionality to the components, platform, and interface that reside within access equipment and/or software 1000.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1024, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

Figure 11:
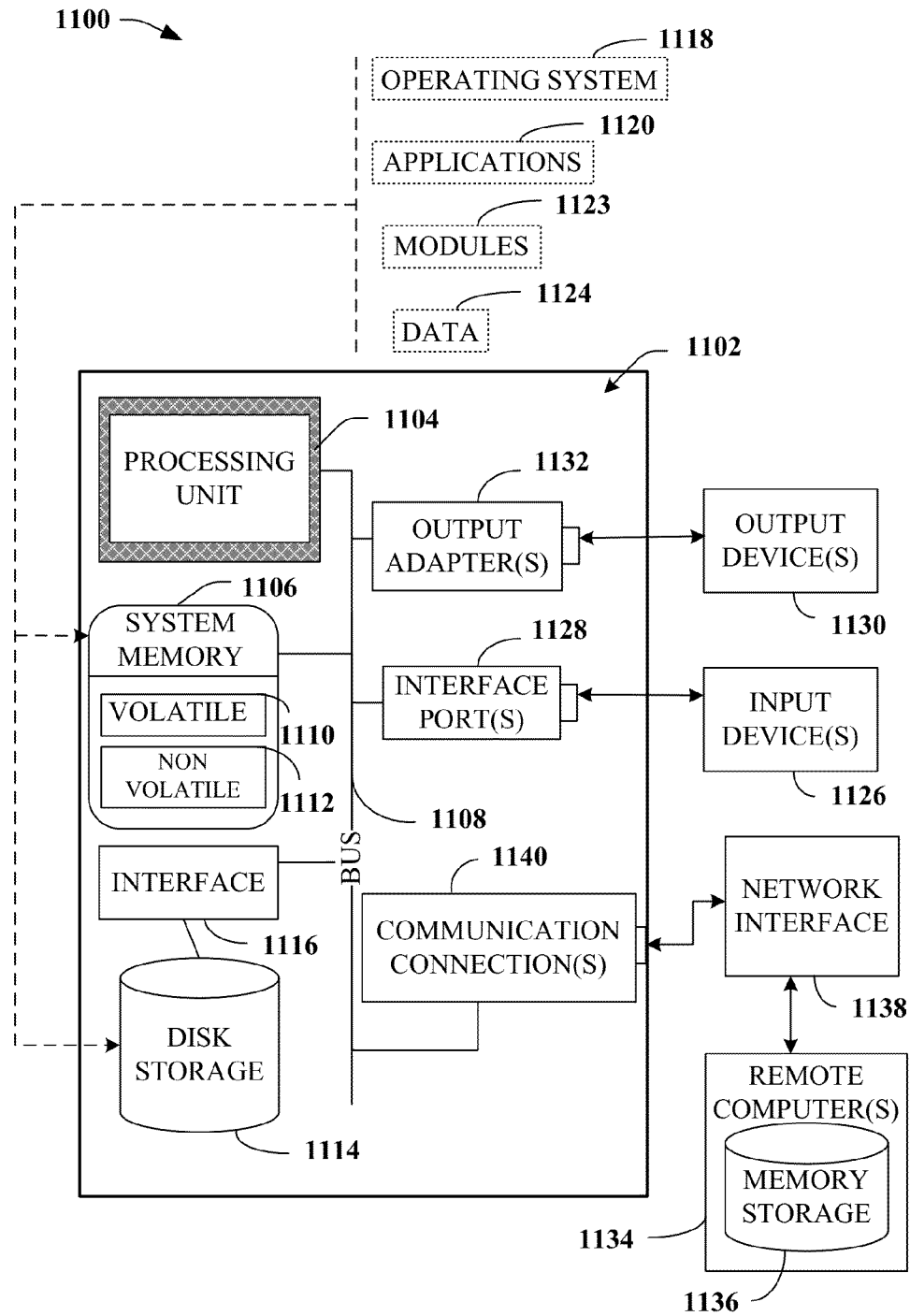
FIG. 11 illustrates a block diagram of a computing system, in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 102) there can be software, which can instruct a processor (such as processor 104) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a PDA, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1102 includes a processing unit 1104, a system memory 1106, and a system bus 1108. System bus 1108 couples system components including, but not limited to, system memory 1106 to processing unit 1104. Processing unit 1104 can be any of various available processors. Dual microprocessors and other multiprocessor architectures also can be employed as processing unit 1104.

System bus 1108 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1106 includes volatile memory 1110 and nonvolatile memory 1112. A basic input/output system (BIOS), containing routines to transfer information between elements within computer 1102, such as during start-up, can be stored in nonvolatile memory 1112. By way of illustration, and not limitation, nonvolatile memory 1112 can include ROM, PROM, EPROM, EEPROM, or flash memory. Volatile memory 1110 can include RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1102 also includes removable/non-removable, volatile/non-volatile computer storage media. In an implementation, provided is a non-transitory or tangible computer-readable medium storing computer-executable instructions that, in response to execution, cause a system including a processor to perform operations. The operations can include initiating a static capacity setting for network parameters (e.g., high capacity settings), measuring a number of downlink radio links, and measuring an uplink noise level. Soft handover radio links can be excluded from the radio link number, according to an aspect. The operations can also include determining that the number of downlink radio links satisfies a radio link condition and/or the uplink noise level satisfies a noise level condition. Further, the operations can include increasing a received signal level parameter and a cell reselection parameter in response to the radio link condition being determined to be satisfied or in response to the noise level condition being determined to be satisfied.

According to an aspect, the operations can include determining the received signal level parameters satisfies a channel power condition and reducing a common pilot channel power by about 2.5 dB per iteration for a up to a predefined number of iterations in response to the channel power condition being determined to be satisfied. Further to this aspect, the operations can include deactivating uplink packet access after the predefined number of iterations.

FIG. 11 illustrates, for example, disk storage 1114. Disk storage 1114 includes, but is not limited to, devices such as a magnetic disk drive, floppy disk drive, tape drive, Jaz drive, Zip drive, LS-100 drive, flash memory card, or memory stick. In addition, disk storage 1114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1114 to system bus 1108, a removable or non-removable interface is typically used, such as interface component 1116.

It is to be noted that FIG. 11 describes software that acts as an intermediary between users and computer resources described in suitable operating environment. Such software includes an operating system 1118. Operating system 1118, which can be stored on disk storage 1114, acts to control and allocate resources of computer system 1102. System applications 1120 can take advantage of the management of resources by operating system 1118 through program modules 1122 and program data 1124 stored either in system memory 1106 or on disk storage 1114. It is to be understood that the disclosed subject matter can be implemented with various operating systems or combinations of operating systems.

A user can enter commands or information, for example through interface component 1116, into computer system 1102 through input device(s) 1126. Input devices 1126 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1104 through system bus 1108 through interface port(s) 1128. Interface port(s) 1128 include, for example, a serial port, a parallel port, a game port, and a universal serial bus (USB). Output device(s) 1130 use some of the same type of ports as input device(s) 1126.

Thus, for example, a USB port can be used to provide input to computer 1102 and to output information from computer 1102 to an output device 1130. Output adapter 1132 is provided to illustrate that there are some output devices 1130, such as monitors, speakers, and printers, among other output devices 1130, which use special adapters. Output adapters 1132 include, by way of illustration and not limitation, video and sound cards that provide means of connection between output device 1130 and system bus 1108. It is also noted that other devices and/or systems of devices provide both input and output capabilities such as remote computer(s) 1134.

Computer 1102 can operate in a networked environment using logical connections to one or more remote computers, such as remote computer(s) 1134. Remote computer(s) 1134 can be a personal computer, a server, a router, a network PC, a workstation, a microprocessor based appliance, a peer device, or other common network node and the like, and typically includes many or all of the elements described relative to computer 1102.

For purposes of brevity, only one memory storage device 1136 is illustrated with remote computer(s) 1134. Remote computer(s) 1134 is logically connected to computer 1102 through a network interface 1138 and then physically connected through communication connection 1140. Network interface 1138 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1140 refer(s) to hardware/software employed to connect network interface 1138 to system bus 1108. While communication connection 1140 is shown for illustrative clarity inside computer 1102, it can also be external to computer 1102. The hardware/software for connection to network interface 1138 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," "module", and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
 a memory to store executable instructions; and
 a processor, coupled to the memory, that facilitates execution of the executable instructions to perform operations, comprising:
  determining a quantity of downlink radio links sent from network devices of a set of network devices to one or more mobile devices within a geographic coverage area, comprising excluding soft handover radio links from the quantity of downlink radio links, wherein the downlink radio links comprise circuit switched radio links and packet switched radio links;
  determining that a measured number of downlink radio links satisfy a first condition; and
  adjusting a network parameter of a network device of the set of network devices comprising reducing the geographic coverage area in response to the first condition being determined to be satisfied.

2. The system of claim 1, wherein the operations further comprise increasing a received signal level and a cell reselection parameter in response to the first condition being determined to be satisfied.

3. The system of claim 1, wherein the operations further comprise:
 measuring an uplink noise level;
 determining that the uplink noise level satisfies a second condition; and
 adjusting the network parameter in response to the second condition being determined to be satisfied.

4. The system of claim 3, wherein the adjusting the network parameter in response to the second condition being determined to be satisfied comprises increasing a received signal level and a cell reselection parameter.

5. The system of claim 1, wherein the operations further comprise initiating a capacity setting for the network parameter before the determining that the measured number of downlink radio links satisfy the first condition.

6. The system of claim 1, wherein the determining the quantity of downlink radio links comprises determining the quantity of downlink radio links between sectors of a wireless network.

7. The system of claim 1, wherein the determining the quantity of downlink radio links comprises determining the quantity of downlink radio links across different carrier networks.

8. The system of claim 1, wherein the operations further comprise:
 determining that a received signal level satisfies a second condition; and
 reducing a pilot channel power in response to the second condition being determined to be satisfied.

9. The system of claim 8, wherein the operations further comprise reducing the pilot channel power by a reduction unit per iteration for a predefined number of iterations.

10. The system of claim 9, wherein the operations further comprise deactivating an uplink packet access on a next iteration after the predefined number of iterations.

11. A method, comprising:
 quantifying, by a system comprising a processor, a number of downlink radio links excluding soft handover radio links;
 determining, by the system, that the number of downlink radio links satisfies a first condition; and
 modifying, by the system, a first network parameter related to a geographic coverage area or a second network parameter related to cell reselection in response to the determining that the first condition is satisfied.

12. The method of claim 11, wherein the first network parameter is a received signal level and the second network parameter is a cell reselection parameter, and further comprising:

increasing, by the system, the received signal level and the cell reselection parameter in response to determining that the first condition is satisfied.

13. The method of claim 11, further comprising:

measuring, by the system, an uplink noise level;

determining, by the system, that the uplink noise level satisfies a second condition; and modifying, by the system, the first network parameter or the second network parameter in response to the determining that the second condition is satisfied.

14. The method of claim 13, wherein the first network parameter is a received signal level and the second network parameter is a cell reselection parameter, and further comprising:

increasing, by the system, the received signal level and the cell reselection parameter in response to the determining that the second condition is satisfied.

15. The method of claim 11, wherein the downlink radio links comprise circuit switched radio links and packet switched radio links.

16. The method of claim 11, further comprising:

initiating, by the system, a static setting before the downlink radio links are measured.

17. A non-transitory computer-readable device storing executable instructions that, in response to execution, cause a system including a processor to perform operations, comprising:

initiating a capacity setting for network parameters of a set of network devices;

measuring a number of downlink radio links of the set of network devices, wherein soft handover radio links are excluded from the number of downlink radio links;

measuring an uplink noise level received by the set of network devices;

determining that the number of downlink radio links satisfies a radio link condition or the uplink noise level satisfies a noise level condition; and increasing a received signal level parameter and a cell reselection parameter in response to the radio link condition being determined to be satisfied or in response to the noise level condition being determined to be satisfied.

18. The non-transitory computer-readable device of claim 17, wherein the operations further comprise:

determining the received signal level parameter satisfies a channel power condition; and reducing a pilot channel power by a reduction unit per iteration for up to a predefined number of iterations in response to the channel power condition being determined to be satisfied.

19. The non-transitory computer-readable device of claim 18, wherein the operations further comprise:

deactivating uplink packet access after the predefined number of iterations.

\* \* \* \* \*